(12) United States Patent
Zoellner

(10) Patent No.: US 8,463,815 B1
(45) Date of Patent: Jun. 11, 2013

(54) SYSTEM AND METHOD FOR ACCESS CONTROLS

(75) Inventor: Keith Zoellner, Austin, TX (US)

(73) Assignee: Storediq, Inc., Austin, TX (US)

(*) Notice: Subject to any disclaimer, the term of this patent is extended or adjusted under 35 U.S.C. 154(b) by 521 days.

(21) Appl. No.: 12/269,222

(22) Filed: Nov. 12, 2008

Related U.S. Application Data

(60) Provisional application No. 61/002,831, filed on Nov. 13, 2007.

(51) Int. Cl.
*G06F 17/30* (2006.01)

(52) U.S. Cl.
USPC ..... 707/783; 707/694; 707/781; 707/999.009

(58) Field of Classification Search
None
See application file for complete search history.

(56) References Cited

U.S. PATENT DOCUMENTS

| | | | |
|---|---|---|---|
| 6,714,930 B1 * | 3/2004 | Garrison et al. | 1/1 |
| 7,801,894 B1 * | 9/2010 | Bone et al. | 707/737 |
| 7,805,449 B1 * | 9/2010 | Bone et al. | 707/751 |
| 7,844,582 B1 * | 11/2010 | Arbilla et al. | 707/694 |
| 2002/0083059 A1 * | 6/2002 | Hoffman et al. | 707/9 |
| 2003/0050919 A1 * | 3/2003 | Brown et al. | 707/2 |
| 2003/0167269 A1 * | 9/2003 | Gupta | 707/9 |
| 2004/0133588 A1 * | 7/2004 | Kiessig et al. | 707/102 |
| 2004/0186836 A1 * | 9/2004 | Schlesinger | 707/9 |
| 2004/0193915 A1 * | 9/2004 | Smith et al. | 713/200 |
| 2006/0117014 A1 * | 6/2006 | Qi | 707/9 |
| 2007/0118901 A1 * | 5/2007 | Focke et al. | 726/22 |
| 2007/0250913 A1 * | 10/2007 | Betz et al. | 726/4 |
| 2008/0201299 A1 * | 8/2008 | Lehikoinen et al. | 707/3 |
| 2009/0106815 A1 * | 4/2009 | Brodie et al. | 726/1 |
| 2010/0145917 A1 * | 6/2010 | Bone et al. | 707/694 |

* cited by examiner

*Primary Examiner* — Anteneh Girma
(74) *Attorney, Agent, or Firm* — Sprinkle IP Law Group

(57) ABSTRACT

Systems and methods for controlling access to objects within a file system utilizing data associated with those objects are disclosed. More specifically, in one embodiment access controls pertaining to a user may be specified in terms of tags which may be associated with an object, and a user's access to objects may be controlled based upon these tags. These tags may reflect the content of the object, or a grouping, category or another type of classification of the object and may be determined through the processing of the object. In particular, in one embodiment, metadata associated with an object may be classified and associated with classification tags associated with those classifications. A user's access to objects may then be specified through a set of classification tags, where the user may access objects associated with those classification tags.

20 Claims, 6 Drawing Sheets

SYSTEM AND METHOD FOR ACCESS CONTROLS

RELATED APPLICATIONS

This application claims priority to U.S. Provisional Patent Application No. 61/002,831, filed Nov. 13, 2007, entitled "Method and System for Access Controls" by Keith Zoellner which is hereby fully incorporated by reference herein for all purposes.

TECHNICAL FIELD

The present invention relates generally to managing and controlling data storage resources. More specifically, embodiments of the present invention relate to a system, method and apparatus for controlling access to file system objects. In particular, embodiments of the present invention relate to implementing access controls with respect to file system objects based on metadata or content related to the file system objects.

BACKGROUND

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices." Block storage devices are not typically accessed directly by users or (most) programs. Rather, programs or other components of the operating system organize block storage in an abstract fashion and make this higher-level interface available to other software components. The most common higher-level abstraction thus provided is a "file system." File systems include, for example, document management systems (in systems such as these certain files are sometimes referred to as documents) including Microsoft Sharepoint, EMC Documentum, IBM File Net, etc.; archive systems (in systems such as these certain files are sometimes referred to as objects) including Symantec's Enterprise Vault, EMC Email Extender, Mimosa, AXS-ONE, etc.; email servers (in systems such as these certain files are sometimes referred to as emails) including, for example, Microsoft Exchange, IBM Lotus Notes etc.; desktops and notebook computers; Content Addressable Storage Platforms (in systems such as these certain files are sometimes referred to as objects), including, for example, EMC's Centera, IBM's DR550, NetApps Snaplock, Hitachi's HDS, etc.

In a file system, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. As is known in the art, metadata is basically "data about data." Directories are basically containers that provide a mapping from directory-unique names to other directories and files. Files are basically containers for arbitrary data. Because directories may contain other directories, the file system client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "file system namespace."

File systems support a finite set of operations (such as create, open, read, write, close, delete, etc.) on each of the abstract objects which the file system contains. For each of these operations, the file system takes a particular action in accordance with the operation in question and the data provided in the operation. The sequence of these operations over time affects changes to the file system structure, data, and metadata in a predictable way. The set of file system abstractions, operations, and predictable results for particular actions can be considered as "semantics" for the file system. While particular file systems differ slightly in their precise semantics, in general file systems implement as a subset of their full semantics a common semantics. This approximately equivalent common semantics can be regarded as the "conventional" or "traditional" file system semantics.

Storage resources accessed by some computer, its software or users need not be "directly" attached to that computer. Various mechanisms exist for allowing software or users on one computing device to access over a network and use storage assets that are actually located on another remote computer or device. There are many types of remote storage access facilities, but they may without loss of generality be regarded as falling into one of two classes: block-level and file-level. File-level remote storage access mechanisms extend the file system interface and namespace across the network, enabling clients to access and utilize the files and directories as if they were local. Such systems are therefore typically called "network file systems." Note that the term "network file system" is used herein generally to refer to all such systems—there is a network file system called Network File System or NFS, originally developed at Sun Microsystems and now in the public domain. When discussing the general class of such systems herein, the lower-case term, for example, "networked file systems" will be used. When discussing the specific Sun-developed networked file system, the fully capitalized version of the term or its acronym, for example, "Network File System or NFS" will be used.

Networked file systems enable machines to access the file systems that reside on other machines. Architecturally, this leads to the following distinctions: in the context of a given file system, one machine plays the role of a file system "origin server" (alternatively, "file server" or "server") and another plays the role of a file system client. The two are connected via a data transmission network. The client and server communicate over this network using standardized network protocols; the high-level protocols which extend the file system namespace and abstractions across the network are referred to as "network file system protocols." Exemplary file system protocols include the Common Internet File System (CIFS), the aforementioned NFS, Novell® Netware file sharing system, Apple® AppleShare®, the Andrew File System (AFS), and the Coda File system (Coda®). These network file system protocols share an approximately equivalent semantics and set of abstractions, but differ in their details and are not interoperable. Thus, to use a file system from a file server, a client must "speak the same language," i.e., have software that implements the same protocol that the file server uses.

A file server indicates which portions of its file systems are available to remote clients by defining "exports" or "shares." To access a particular remote file server's file systems, a client must then make those exports or shares of interest available by including them by reference as part of their own file system namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between file system clients and file systems, additional challenges exist in managing access to and utilization of file systems. One of the main concerns relates to the implementation of security or access controls with respect to the data stored in conjunction with these various file systems. More particularly, after a review of the above discussion it may be ascertained that a wide variety of users at a wide variety of location may be able to request objects (for example, files or other things stored) within one or more file systems. In many cases, however, it may be desirable to control the access of the various users to the data within the file systems.

This concern may be particularly germane when allowing access to certain data by those outside of an organization associated with the file systems, for example various auditors, compliance officers, legal counsel, etc. In fact, it may be desired to limit the access of such users only to those file which comprise data which may be related to their specific jobs or tasks.

Imposing these sorts of access controls on such users (or other users for that matter) may present a significant challenge because of both the organization of the typical file system and the fact that the objects stored in conjunction with a file system may comprise unstructured or semi-structured data. As such, it may only be possible to control access of a user to file system objects based upon the location of those object.

Accordingly, improved systems and methods for controlling access to objects of a file system are desired.

SUMMARY

Systems and methods for controlling access to objects within a file system utilizing data associated with those objects are disclosed. More specifically, in one embodiment access controls pertaining to a user may be specified in terms of tags which may be associated with an object, and a user's access to objects may be controlled based upon these tags. These tags may reflect the content of the object, or a grouping, category or another type of classification of the object and may be determined through the processing of the object. In particular, in one embodiment, metadata associated with an object may be classified and associated with classification tags associated with those classifications. A user's access to objects may then be specified through a set of classification tags, where the user may access objects associated with those classification tags.

In one embodiment, a method for controlling access may include determining a user identifier corresponding to a user requesting access to an object in a file system. Using this user identifier a set of associated classification tags may also be determined along with classification tags associated with the object and determined from metadata associated with the object. A user's authorization to access the object may then be determined based upon these two sets of classification tags.

Aspects and embodiments of the invention may provide the advantage of allowing users accesses to objects within a file system to be controlled based upon the objects themselves or data associated with the objects. Additionally, the level or type of access a user may have to particular objects may also be controlled with a fine level of granularity.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
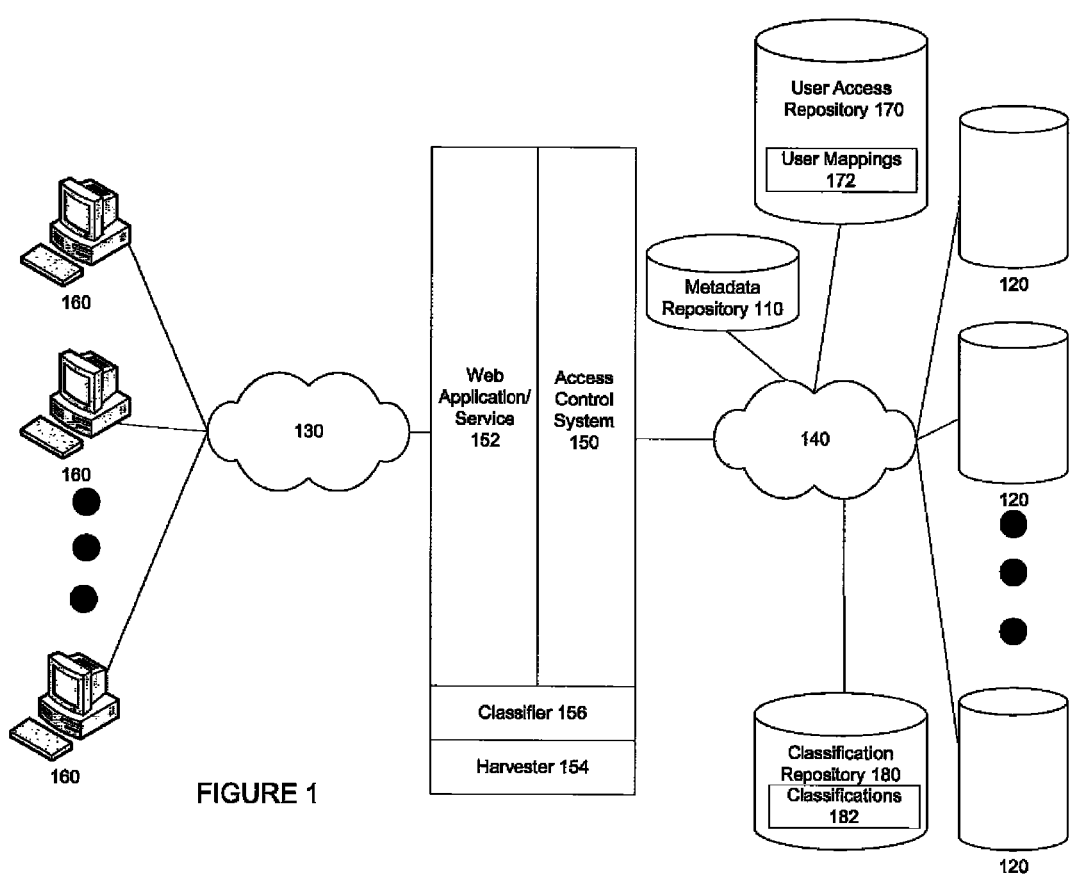
FIG. 1 is a block diagram of one embodiment of an access control system and an associated embodiment of an architecture.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief review of the following applications may be helpful: U.S. patent application Ser. No. 10/630,339 entitled "Method and Apparatus for Managing File Systems and File-Based Data Storage" by inventors Jeff G. Bone et al., filed Jul. 30, 2003, U.S. patent application Ser. No. 11/262,283 entitled "Method and Apparatus for Harvesting File System Metadata" by inventors Jeff G. Bone et al., filed Oct. 28, 2005, U.S. patent application Ser. No. 11/262,282 entitled "System, Method and Apparatus for Enterprise Policy Management" by inventors Jeff G. Bone et al., filed Oct. 28, 2005, U.S. patent application Ser. No. 11/262,411 entitled "System and Method for Involving Users in Object Management" by inventors Laura Arbilla et al., filed Oct. 28, 2005, U.S. patent application Ser. No. 11/524,831 entitled "System and Method for Classifying Objects" by inventors Keith Zoeliner et al., filed Sep. 21, 2006, U.S. patent application Ser. No. 11/645,205 entitled "Browser-Based System and Method for Defining and Manipulating Expressions" by inventors Keith Zoeliner et al., filed Dec. 22, 2006, and U.S. patent application Ser. No. 11/965,934 entitled "System and Method for Adaptive Sentence Boundary Disambiguation" by inventor Keith Zoeliner, filed Dec. 28, 2007, the entire contents of which are hereby expressly incorporated by reference for all purposes.

Additionally a brief overview of the context of the disclosure may be helpful. As discussed above, it may be desirable to control the access of the various users to the data within the file systems but imposing these sorts of access controls on users (or any other users for that matter) may present a significant challenge, in no small part because of the organization of the typical file system.

A general comparison between typical databases systems and typical file systems may provide an insight as to the difficulty in providing access controls with respect to certain file systems. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation.

This trigger mechanism may be utilized to implement some form of security with respect to databases. But, as can be seen, the reason one form of access controls may be implemented with respect to data in a database system is precisely because the data within a database system is structured. The analogous facility is not available in file systems because file systems are quasi-hierarchical collections of directories and files where each of the files may be of a different type, comprise different types of data, etc.

In a typical enterprise, the files and directories stored in the file systems may comprise the work product or intellectual property produced by its knowledge workers. The work product may include business-critical assets and may range from Excel spreadsheets representing an aspect of the financial health and state of the enterprise to domain-specific artifacts such as Word documents representing memos to customers.

Thus, the objects stored in conjunction with a file system may comprise unstructured or semi-structured data. In other words, the objects or data within the objects may not adhere to any uniform structure or schema. Consequently, it is difficult both to manage such unstructured or semi-structured data and to implement access controls with respect to this unstructured data.

In most cases, then the unstructured and semi-structured information stored in file systems is largely "unmanaged." It is perhaps backed up but little or no effort is made to understand what the information is, what its relevance or importance to the business might be, or even whether it is appropriately secured. Usually, in fact, it may only be possible to control access of a user to file system data based upon the location of that data.

For example, currently, the "intelligence" that a conventional file system exhibits with respect to access control is typically restricted to a static set of rules defining file owners, permissions, and access control lists. Users may be given access to a certain area of the file system (for example, the user's inbox, certain directories or partitions of a file system, etc.). Thus, the user may access any objects within the area to which he is given access (for example, in his directory), while he may not be able to access objects outside these areas. Thus, access to file system objects may be based upon the location of that object with respect to the file system, not based on the user or the object itself.

This situation may be less than ideal, as it may be desired to give user's access to objects based on the objects themselves (for example, the content or data pertaining to, describing or associated with the object) or the user and not the location of the object. Thus, for example, it may be desirable to give a user access to a particular object within a particular directory but deny access to other objects within that same directory or to give a user access to a particular email within a particular inbox but deny access to other emails within the same inbox, etc.

The ability to control access based upon the object (or the particular user) may be particularly important in certain circumstances, for example, a legal consultant from outside an organization may be given access to objects pertaining to a certain subject across all file systems, irrespective of the location of those objects, but it may also be desired to restrict the legal consultants access to all other objects in the file systems, again irrespective of the location of those objects. Similarly, it may be desired to give a compliance officer access to objects pertaining to a certain subject and deny access to other objects. Generally, then, it is desired to control access to an object based on the object itself (for example, content of the object, semantics of the object, etc.) not the location of the object with respect to a file system.

To that end, attention is now directed to systems and methods for controlling access to objects within a file system utilizing data associated with those objects. More specifically, in one embodiment access controls pertaining to a user may be specified in terms of tags which may be associated with an object, and a user's access to objects may be controlled based upon these tags. These tags may reflect the content of the object, or a grouping, category or another type of classification of the object and may be determined through the processing of the object. In particular, in one embodiment, metadata associated with an object may be classified and associated with classification tags associated with those classifications. A user's access to objects may then be specified through a set of classification tags, where the user may access objects associated with those classification tags.

Turning now to FIG. 1, one embodiment of the implementation of access controls is depicted. Users at one or more computing devices 160 may access objects within one or more file systems 120 over one or more communication networks 130, 140, which may be the same or similar networks such as a WAN, a LAN, the Internet or another communication network altogether.

File systems 120 may comprise unstructured data, semi-structured data such as document management systems (for example, Sharepoint and Documentum), e-mail systems like exchange or notes, etc., or the data in file systems 120 may comprise structured data such as that utilized by database systems or the like.

In one embodiment, users may utilize a web-based application or services 152 to access objects in the one or more file systems 120. Web-based application 152 includes a user interface that operates to provide a plurality of functionalities that enable user(s) at computing devices 160 to, for example, to harvest and browse metadata, generate reports, define and execute policies, access and browse objects of file systems 120, etc.

Access control system 150 may comprise an application (for example, one or more computer executable instruction) configured to control the access of users at computing devices 160 to file systems 120, objects within file systems 120 or metadata on these objects in metadata repository 110. Access control system 150 may utilize a harvester module 154 to collect metadata on objects in file system 120 and store the metadata on these objects in metadata repository 110. A classifier module 156 may classify these objects based on the metadata associated with these object using a set of classifications 182 in classification repository 180. A mapping 172 in user access repository 170 may specify which classifications which a particular user may access (or not access, etc.). Using these mappings 172, access control system 150 may control the access of users to objects in file systems 120. In particular, access control system may identify a user requesting access and the objects to which the user is requesting access. The access control system 150 may determine which requested objects the user may, or may not, access based upon the classifications associated with the user and the objects.

More specifically, in one embodiment metadata repository 110 may comprise data collected on or from objects within file systems 120, metadata which results from the processing of any of the data collected on or from these objects or any processing of the data of the object itself. In particular, in one embodiment, metadata repository 110 may comprise metadata associated with objects in file system 120 including tags pertaining to one or more classifications, grouping, etc., such that a set of tags may be associated with an object in file system 120.

These tags may result from the processing done on the object itself, metadata obtained from the object, metadata resulting from processing done on the metadata obtained from the object, etc. Thus, metadata obtained from or pertaining to objects in file systems 120 may be stored in metadata repository 110, where the metadata comprises tags pertaining to the object and the tags may indicate one or more classifications, groupings, etc. corresponding to the object.

Figure 2:
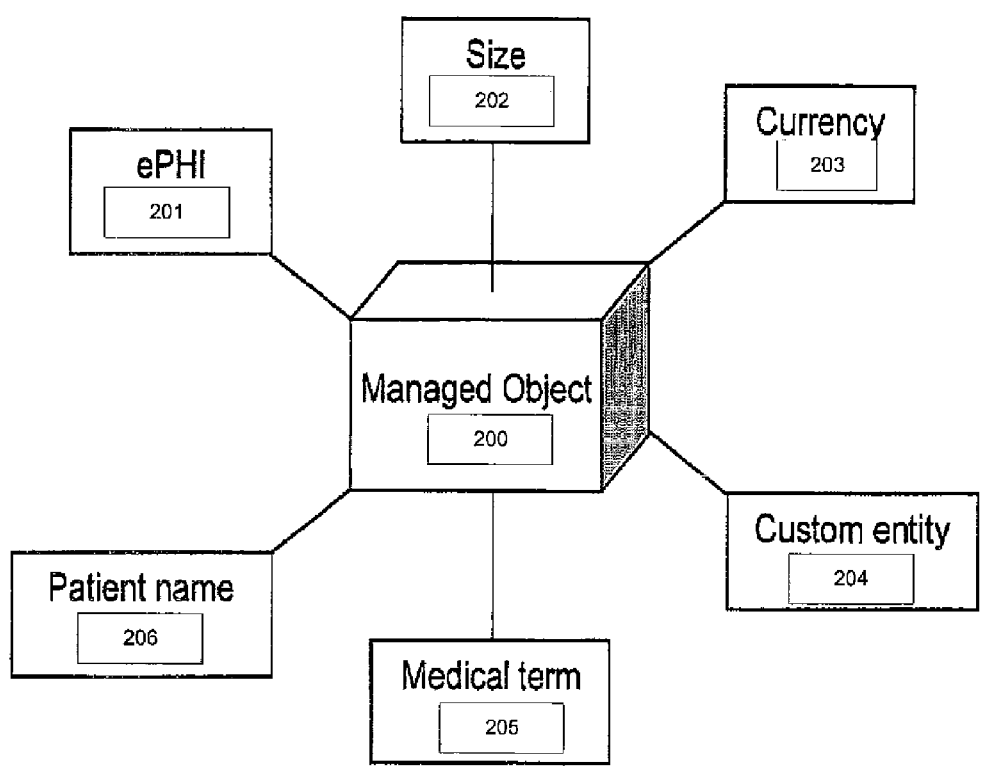
FIG. 2 is a block diagram of one embodiment of an object.

FIG. 2 is a block diagram depicting an example object (in this case, a file 200) with a plurality of metadata (in this case, attributes 201-206). As an artisan will appreciate, the number and types of attributes shown here are meant to be exemplary and not to be construed as limiting. In this example, attribute 201 indicates that file 200 contains electronic Protected Health Information (ePHI); attribute 202 indicates the file size of file 200; attribute 203 indicates the age or "freshness"

of file 200; attribute 204 indicates that file 200 contains or is associated with certain custom entities, e.g., projects; attribute 205 indicates that file 200 contains or relates to a medical term; and attribute 206 indicates that file 200 is associated with a particular patient.

In embodiments of the invention, harvester 170 may be used to obtain metadata from objects in file systems 120. Harvested metadata can encompass the full and unique (disjoint) semantics of each given file system protocol. As shown in FIG. 2, types of "harvested" metadata according to embodiments of the invention can include, but are not limited to:

File system metadata, e.g., size 202, currency 203, etc. These are typical file system attributes from file systems and correlated application such as size, owner, various measurements of "age," and so on.

Content-based metadata, e.g., patient name 206, medical term 205, etc. These are content-specific entities within documents that can be described by the presence or absence of various keywords (or combinations of keywords), regular expressions, concepts, proximity, scope, and so on. A regular expression is a character sequence that is an abbreviated definition of a set of strings. A concept is described by a natural language entity (e.g., "Phil's Pharmacy"). Content-based metadata can be used to define entities in file classifications, each of which consists of one or more attributes and can be associated with one or more volumes.

Synthesized metadata. These may be mathematical checksums or hashes of file contents.

High-level "semantic" attributes, e.g., ePHI 201, that serve to classify and categorize files and documents, useful for automating application of appropriate policies.

Other forms of metadata can also be used in conjunction with embodiments of the invention.

Figure 3:
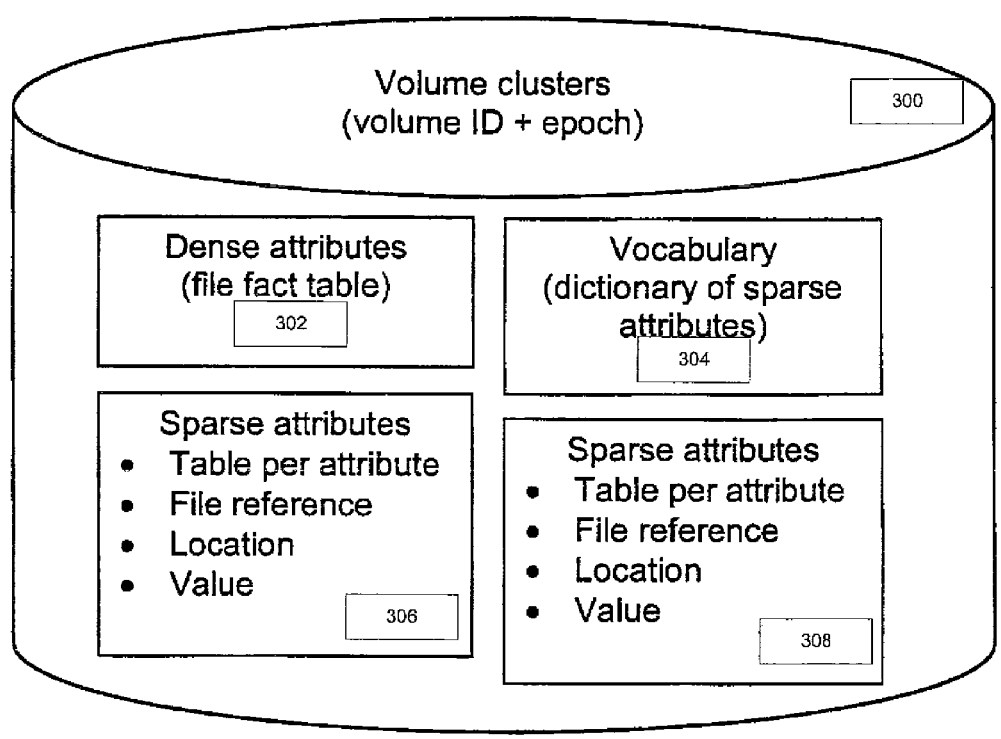
FIG. 3 is a block diagram of one embodiment of a metadata repository.

FIG. 3 depicts one embodiment of an example metadata repository 300 for storing various types of metadata of objects. In this example, metadata repository 300 contains four volume clusters 302, 304, 306, 308, each of which stores a set of dense attributes, a set of sparse attributes, or a dictionary thereof. Metadata repository 300 is configured to store both dense and sparse attributes of all managed files and directories. Dense attributes are attributes that are common to all managed objects (objects within file systems), e.g., file system metadata. Sparse attributes are attributes that may be uncommon or even unique to a single object, e.g., attribute tables, file reference, location, value, etc.

Returning to FIG. 1, classification repository 180 may comprise one or more classifications 182. A classification may comprise an expression associated with one or more attributes or attribute values and a corresponding classification tag. Thus, the expression may be used to evaluate the attributes associated with an object. This expression may be, for example, a Boolean expression such that if the expression evaluates to "True" or "1" the tag associated with the classification may be applied to the object by, for instance, storing the classification tag in the metadata repository 110 in association with that object.

User access repository 170 may comprise data associated with one or more users who wish to access file systems 120 from computing devices 160. More specifically, user access control database 170 may comprise a set of mappings 172. Each mapping comprising a user identifier and a corresponding set of classification tags corresponding to objects which that user may access (for example, if an object in file systems 120 is associated with that tag the user may access that object). The mappings may be created, for example, by a user with administrative privileges using web application 182 or by almost any other means desired.

Thus, when a user logs in or otherwise authenticates himself, access control system 150 may, based upon an identifier associated with the user, obtain a set of classification tags corresponding to the user from user access control database 170 using mappings 172. These tags may correspond to a set of classifications that user is authorized to access. When the user tries to access a particular object in file system 120 the metadata pertaining to that object in metadata repository 110 may be accessed by access control system 150 and compared to the set of classification tags pertaining to the user. If the object corresponds to a classification which the user is authorized to access the user may be allowed to access the data base object (for example, view the content, modify the content, etc.) while if the classification(s) that the user is authorized to access does not correspond to a classification of the object the user may be denied access.

Furthermore, in one embodiment, the level of granularity or access which a user has may also be controlled. More specifically, in one particular embodiment, a mapping 172 associated with a user identifier may comprise a set of access levels, each access level corresponding to a set of classification tags. A level of access may for example, specify the type of information that a user may have access to, for example a user may access only the metadata corresponding to an object of a certain classification, may only access only a portion or type of metadata corresponding to an object associated with another classification, or may access the object itself if the object corresponds to a third classification. In the same vein, a mapping 172 may specify an access type, through the association of each access type with a set of classification tags. For example, that a user may modify objects of a particular classification, may only view of another classification, etc. By specifying access controls for a user based upon the object itself (for example, based on metadata, such as tags specifying classification of an object, etc.) a user's access to such object may be controlled to a fine level of granularity based upon the content, classification or some other designation associated with an object.

Figure 4:
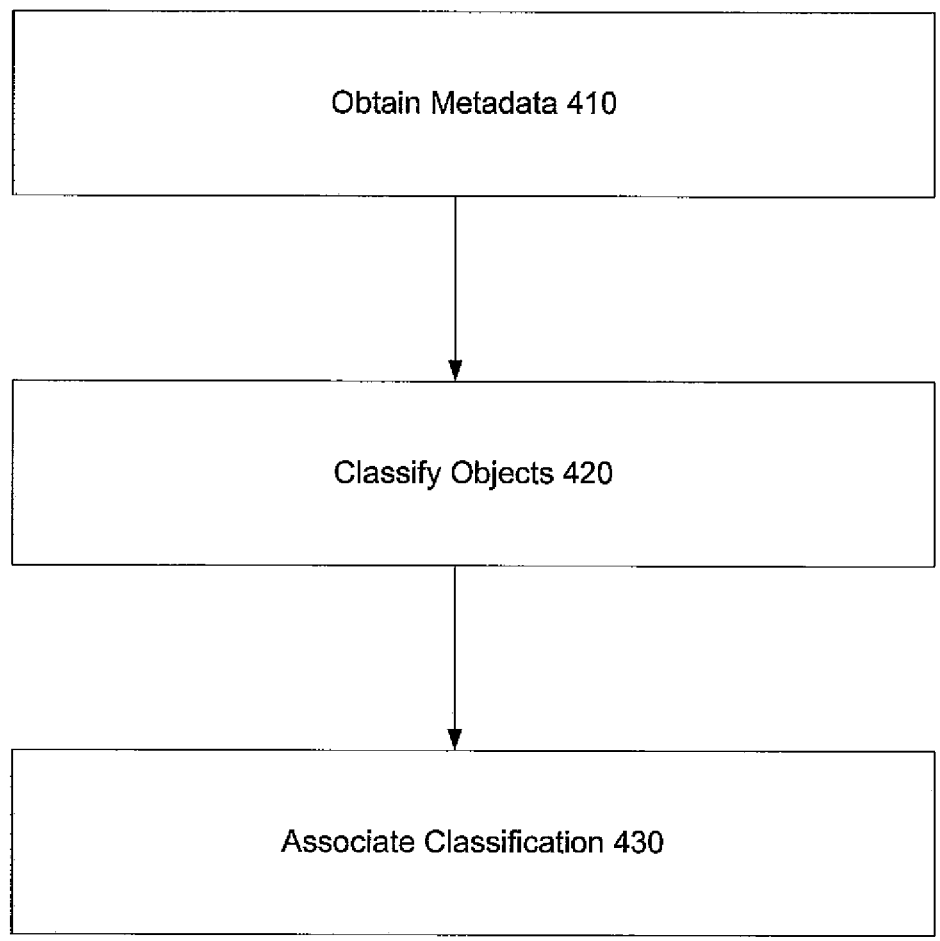
FIG. 4 is a flow diagram of one embodiment of a method for classifying objects.

Moving now to FIG. 4 one embodiment of a method for the association of classification tags with an object in the file systems. This method may be illustrated by way of example in tandem with FIG. 5 which depicts one embodiment of an access control system. Specifically, at step 410 metadata on objects within file systems may be obtained and stored in the metadata repository such that it is associated with the corresponding object used to generate such metadata. Embodiments of obtaining and storing such metadata are discussed in more detail in U.S. application Ser. No. 10/630,339 entitled "Method and Apparatus for Managing File Systems and File-Based Data Storage" by inventors Jeff G. Bone et al., filed Jul. 30, 2003 and U.S. application Ser. No. 11/262,282 entitled "System, Method and Apparatus for Enterprise Policy Management" by inventors Jeff G. Bone et al., filed Oct. 28, 2005, the entire contents of which are hereby expressly incorporated by reference for all purposes.

Figure 5:
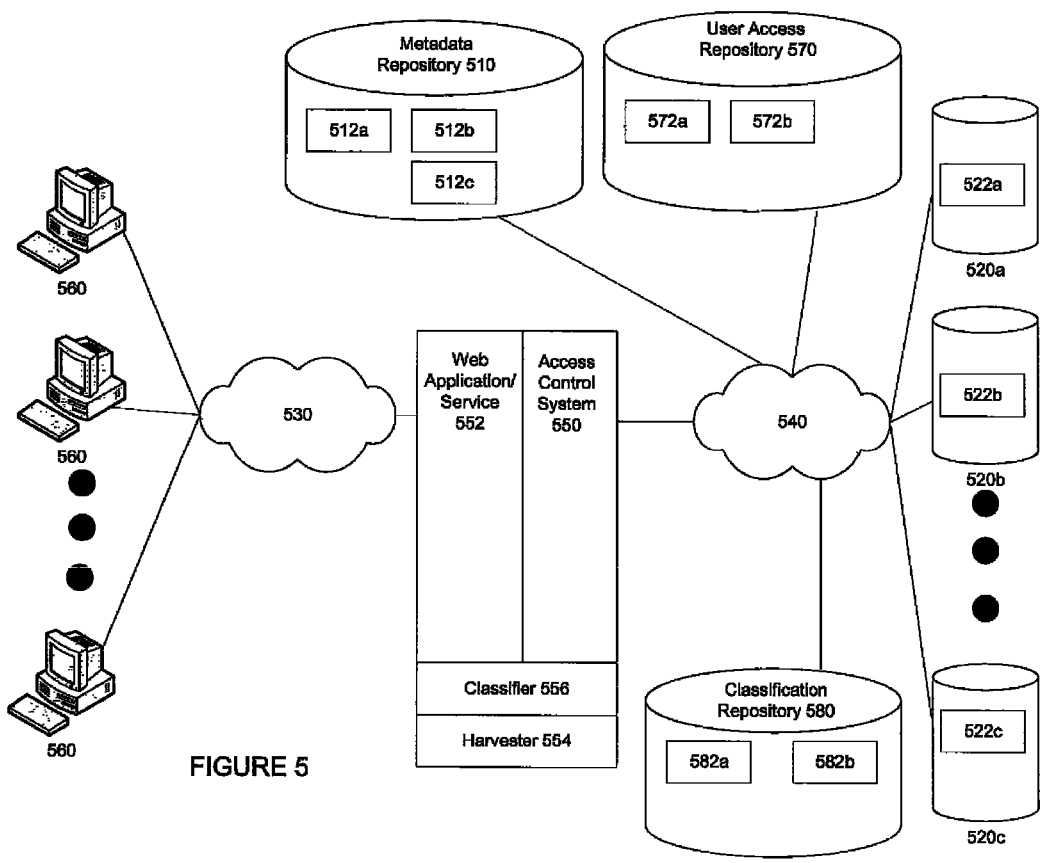
FIG. 5 is a block diagram of one embodiment of an access control system and an associated embodiment of an architecture.

To illustrate with respect to the example in FIG. 5, suppose that objects 522a, 522b and 522c, are stored respectively in file systems 520a, 520b and 520c. Each of objects 522a, 522b and 522c may be utilized to generate at least a portion, respectively, of metadata 512a, 512b, and 512c in metadata repository 510, where each of metadata 512a, 512b, and 512c may be associated with a respective corresponding object 522a, 522b and 522c. This action may be accomplished for example, utilizing harvester module 570 at a certain time interval, such that metadata associated with objects may be updated with a certain frequency and that metadata corresponding to objects newly added to file systems 520 may be generated and stored at this same frequency.

At step 420, classification of objects may occur. This classification may, in one embodiment, comprise obtaining the set of classifications from the classification repository, where each classification comprises an expression for evaluating the metadata associated with an object and an associated classification tag. For a particular classification, the metadata associated with an object in the file systems may then be processed utilizing the expression to determine if the object should be classified with the associated classification tag. This processing may, for example, comprise utilizing a Boolean expression corresponding to the metadata and evaluating the Boolean expression to determine if the expression is "TRUE" or "FALSE".

If the processing of the metadata corresponding to the object using the expression indicates that the object should be associated with the object, at step 430 the object may be associated with the classification by, for example, storing the classification tag as metadata (for example, added to the already existing metadata) associated with that object. Thus, the classification tag may also become metadata associated with the object.

Again, illustrating with respect to FIG. 5 suppose that two classifications 582a and 582b are stored in classification repository 580. Classification 582a comprises the expression "User=Tom" and the classification tag "Tom" and classification 582b comprises the expression "User=Larry" and the classification tag "Larry". Further, suppose that object 522a was created by Tom and thus metadata 512a comprise the attribute "User" having the value "Tom". Similarly, suppose that object 522b was created by Larry and thus metadata 512b comprise the attribute "User" having the value "Larry" and object 522c was created by Dick and thus metadata 512c comprise the attribute "User" having the value "Dick".

Thus, during classification, classifications 582 may be obtained. When classification 582a is evaluated each of metadata 512a, 512b and 512c (corresponding respectively to objects 522a, 522b and 522c) may be processed using the expression "User=Tom". In this case, as metadata 512a comprises the attribute "User" with the value of "Tom" the classification tag "Tom" may be added to stored metadata 512a such that the classification tag "Tom" is associated with object 522a. As metadata 512b and 512c may have the attribute "User" but have values for that attribute which is not "Tom", the classification tag "Tom" will not be stored in metadata 512b or 512c. In a similar manner then, during evaluation of classification 572b the classification tag "Larry" will be stored with metadata 512b to associate this classification tag with object 522b.

This classification of objects may be accomplished for example, utilizing classifier module 554 at a certain time interval, such that classifications associated with objects may be updated with a certain frequency and that newly added objects may be classified, and objects classified according to newly added classification, at this same frequency.

Figure 6:
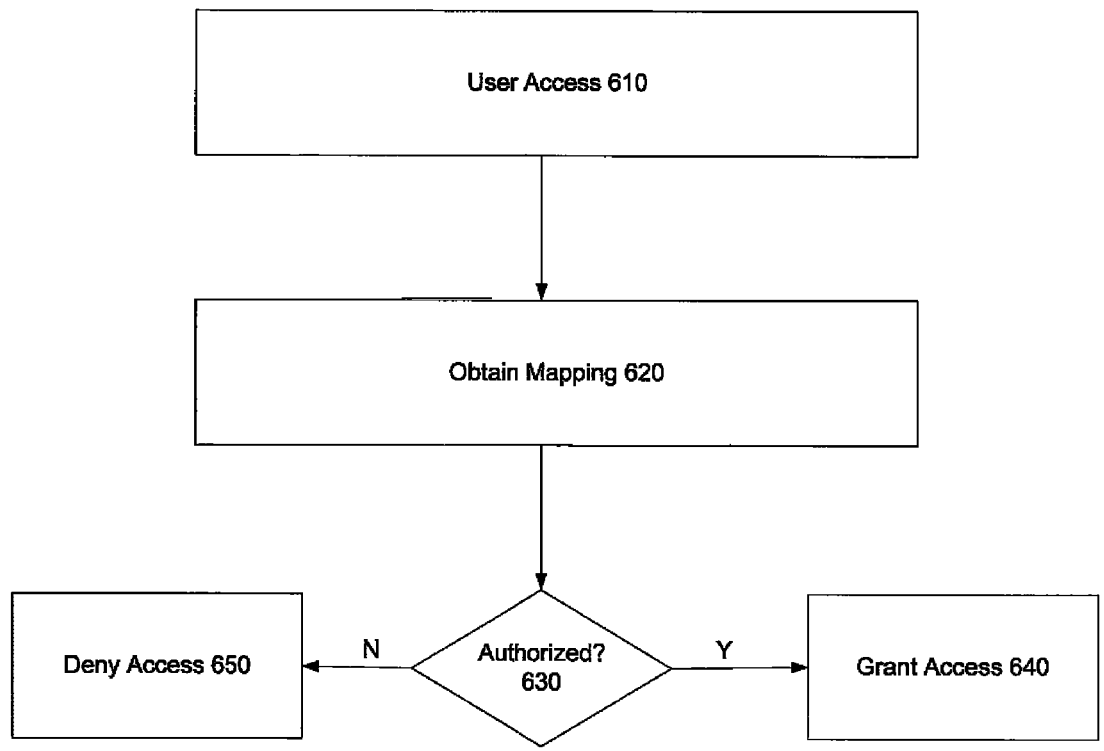
FIG. 6 is a flow diagram of one embodiment of a method for controlling access.

When a user accesses the file systems, these classifications may be utilized to control access of the users to particular objects within the file systems, irrespective of the location of the object within the file system or the type of object. FIG. 6 depicts one embodiment of just such a method for controlling user access to objects in the file systems. Again, this method may be illustrated by way of reference to FIG. 5 which depicts one embodiment of an access control system.

At step 610 a user may attempt to access a file system. When such an access occurs a user identifier such as a logon name or other type of user identifier may be received. Furthermore, an object identifier corresponding to each of one or more objects in the file system which a user is attempting to access may be determined. For example, if a user is attempting to open a file, the object identifier corresponding to that file may be determined, while if a user is searching for a particular term within the objects of a file system a set of object identifiers corresponding to the set of objects containing that term may be determined, etc.

With reference to FIG. 5, suppose mapping 572a comprises the user identifier for Tom and the associated corresponding classification tag "Tom" and mapping 572b comprises the user identifier for Larry and the associated corresponding classification tag "Larry". Suppose again that both Tom and Larry try to access objects 512a, 512b and 512c through web application 552 using a computing device 560. In this case, access control system 550 may receive the user identifiers for Tom and corresponding object identifiers for objects 512a, 512b and 512c. Similarly, access control system 520 may receive the user identifiers for Larry and corresponding object identifiers for objects 512a, 512b and 512c.

Returning to FIG. 6, at step 620, a mapping corresponding to the received user identifier may be obtained. This mapping may comprise a set of classification tags that the user corresponding to the user identifier is authorized to access. Using these classification tags it can be determined, at step 630, if the user corresponding to the user identifier is authorized to access each of the objects corresponding to the object identifiers by, in one embodiment, obtaining the metadata associated with each object identifier and determining if the metadata comprises one or more of the classification tags that the user is authorized to access. If so, than the user may be granted access to the object at step 640, while if not, the user may be denied access at step 650. This denial of access may take a variety of forms, including, not presenting the object in response to a search, notifying an administrator of unauthorized access, notifying a user of denial of access, or almost any other action desired.

Utilizing FIG. 5 once again to illustrate, when Tom and Larry try to access objects 522a, 522b and 522c access control system 550 may receive the user identifiers for Tom and corresponding object identifiers for objects 522a, 522b and 522c. Similarly, access control system 550 may receive the user identifiers for Larry and corresponding object identifiers for objects 522a, 522b and 522c. Access control system 550 may then obtain mappings 572a corresponding to the user identifier for Tom, where the mapping 572a comprises the classification tag "Tom". Access control system 550 may then access metadata 512a, 512b and 512c corresponding to the object identifiers for objects 522a, 522b and 512c to see if this metadata comprises the classification tag "Tom". As only metadata 512a comprises the classification tag "Tom", the user Tom may be granted access to object 522a and denied access to objects 522b and 522c.

Likewise, access control system 550 may then obtain mappings 572b corresponding to the user identifier for Larry, where the mapping comprises the classification tag "Larry". Access control system may then access metadata 512a, 512b and 512c corresponding to the object identifiers for objects 522a, 522b and 522c to see if this metadata comprises the classification tag "Larry". As only metadata 512b may comprise the classification tag "Larry", the user Larry may be granted access to object 522b and denied access to objects 522a and 522c.

In the foregoing specification, the invention has been described with reference to specific embodiments. However, one of ordinary skill in the art appreciates that various modifications and changes can be made without departing from the scope of the invention as set forth. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for controlling access to file system objects, comprising:
    in a network having a plurality of machines running networked file systems, implementing an access control system on a server computer, the access control system being communicatively connected to a metadata repository storing metadata associated with objects in the file systems, the metadata including a plurality of classification tags, each of the plurality of classification tags being stored in the metadata repository in association with an object as a result of an evaluation of an expression in a classification, the classification being stored in a classification repository communicatively connected to the access control system;
    in response to a request for a user to access a file system in the network, the access control system determining a user identifier associated with the user and an object identifier corresponding to each of one or more objects in the file system that the user is requesting access;
    the access control system determining a first set of classification tags that the user associated with the user identifier is authorized to access;
    the access control system determining, from the plurality of classification tags, a second set of classification tags associated with the object identifier corresponding to the each of the one or more objects in the file system that the user is requesting access;
    the access control system determining if the user is authorized to access the file system by comparing each of the first set of classification tags that the user associated with the user identifier is authorized to access with the second set of classification tags associated with the one or more objects in the file system that the user is requesting access; and
    the access control system controlling access of the user to the one or more objects in the file system that the user is requesting access based upon a result of the comparing.

2. The method of claim 1, wherein the metadata stored in the metadata repository comprises results from processing data collected on or from the objects in the file systems.

3. The method of claim 1, wherein the expression in the classification is associated with object attributes.

4. The method of claim 1, wherein the metadata repository comprises volume clusters for storing attributes of all the objects in the file systems.

5. The method of claim 1, further comprising:
    associating the user identifier with a plurality of access levels that the user is authorized to access.

6. The method of claim 5, wherein each of the plurality of access levels corresponds to a set of classification tags specifying types of information that the user is authorized to access.

7. The method of claim 1, wherein the metadata includes file system metadata, content-based metadata and synthesized metadata.

8. The method of claim 1, wherein the determining if the user is authorized to access the file system includes determining a type of access the user is authorized to perform.

9. The method of claim 1, further comprising updating the metadata repository at a time interval to include metadata corresponding to objects newly added to the file systems in the network.

10. An apparatus comprising a set of computer executable instructions stored on a non-transitory computer readable medium, and executable by a computer for:
    implementing an access control system in a network having a plurality of machines running networked file systems, the access control system being communicatively connected to a metadata repository storing metadata associated with objects in the file systems, the metadata including a plurality of classification tags, each of the plurality of classification tags being stored in the metadata repository in association with an object as a result of an evaluation of an expression in a classification, the classification being stored in a classification repository communicatively connected to the access control system;
    in response to a request for a user to access a file system in the network, determining a user identifier associated with the user and an object identifier corresponding to each of one or more objects in the file system that the user is requesting access;
    determining a first set of classification tags that the user associated with the user identifier is authorized to access;
    determining, from the plurality of classification tags, a second set of classification tags associated with the object identifier corresponding to the each of the one or more objects in the file system that the user is requesting access;
    determining if the user is authorized to access the file system by comparing each of the first set of classification tags that the user associated with the user identifier is authorized to access with the second set of classification tags associated with the one or more objects in the file system that the user is requesting access; and
    controlling access of the user to the one or more objects in the file system that the user is requesting access based upon a result of the comparing.

11. The apparatus of claim 10, wherein the metadata stored in the metadata repository comprises results from processing data collected on or from the objects in the file systems.

12. The apparatus of claim 10, wherein the expression in the classification is associated with object attributes.

13. The apparatus of claim 10, wherein the metadata repository comprises volume clusters for storing attributes of all the objects in the file systems.

14. The apparatus of claim 10, wherein the set of computer executable instructions are further executable by the computer for:
    associating the user identifier with a plurality of access levels that the user is authorized to access.

15. The apparatus of claim 14, wherein each of the plurality of access levels corresponds to a set of classification tags specifying types of information that the user is authorized to access.

16. The apparatus of claim 10, wherein the metadata includes file system metadata, content-based metadata and synthesized metadata.

17. The apparatus of claim 10, wherein the determining if the user is authorized to access the file system includes determining a type of access the user is authorized to perform.

18. The apparatus of claim 10, wherein the set of computer executable instructions are further executable by the computer for:
updating the metadata repository at a time interval to include metadata corresponding to objects newly added to the file systems in the network.

19. A computer program product comprising at least one non-transitory computer readable medium storing instructions translatable by at least one processor to perform:
implementing an access control system in a network having a plurality of machines running networked file systems, the access control system being communicatively connected to a metadata repository storing metadata associated with objects in the file systems, the metadata including a plurality of classification tags, each of the plurality of classification tags being stored in the metadata repository in association with an object as a result of an evaluation of an expression in a classification, the classification being stored in a classification repository communicatively connected to the access control system;
in response to a request for a user to access a file system in the network, determining a user identifier associated with the user and an object identifier corresponding to each of one or more objects in the file system that the user is requesting access;
determining a first set of classification tags that the user associated with the user identifier is authorized to access;
determining, from the plurality of classification tags, a second set of classification tags associated with the object identifier corresponding to the each of the one or more objects in the file system that the user is requesting access;
determining if the user is authorized to access the file system by comparing each of the first set of classification tags that the user associated with the user identifier is authorized to access with the second set of classification tags associated with the one or more objects in the file system that the user is requesting access; and
controlling access of the user to the one or more objects in the file system that the user is requesting access based upon a result of the comparing.

20. The computer program product of claim 19, wherein instructions are further translatable by the at least one processor to perform:
associating the user identifier with a plurality of access levels that the user is authorized to access, wherein each of the plurality of access levels corresponds to a set of classification tags specifying types of information that the user is authorized to access.

* * * * *